United States Patent

Kang

[11] Patent Number: 4,686,268
[45] Date of Patent: Aug. 11, 1987

[54] COPOLYMERS OF BENZOTRIAZOL MONOMERS WITH MALEIC OR FUMARIC ACID DERIVATIVES AND POLYMERIC MATERIAL COMPOSITIONS

[75] Inventor: Seoh Won Kang, Busan, Rep. of Korea

[73] Assignee: Morisawa & Co., Ltd., Tokyo, Japan

[21] Appl. No.: 873,524

[22] Filed: Jun. 11, 1986

[51] Int. Cl.$^4$ .............................................. C08F 26/06
[52] U.S. Cl. ................................. 526/259; 526/261; 548/951
[58] Field of Search ................. 526/259, 261; 548/951

*Primary Examiner*—Paul R. Michl
*Assistant Examiner*—Alex H. Walker
*Attorney, Agent, or Firm*—Wenderoth, Lind & Ponack

[57] ABSTRACT

Copolymers of average molecular weight within the range from about 1,000 to about 50,000, preferably from about 1,000 to about 10,000, are provided containing the repeating polymeric unit having the formula (I) and the repeating polymeric unit having the formula (II):

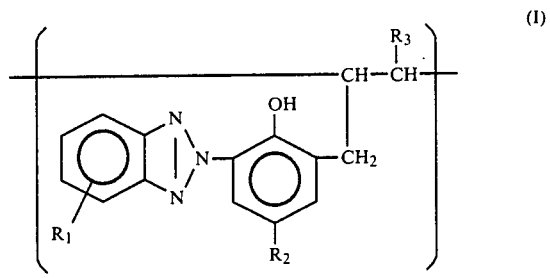

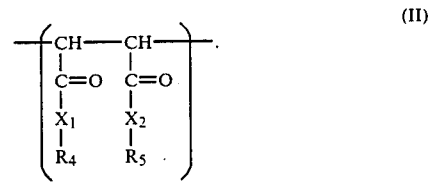

17 Claims, No Drawings

COPOLYMERS OF BENZOTRIAZOL MONOMERS WITH MALEIC OR FUMARIC ACID DERIVATIVES AND POLYMERIC MATERIAL COMPOSITIONS

BACKGROUND OF THE INVENTION

The present invention relates to high polymeric material compositions which are stabilized against photo-deterioration. More particularly the present invention relates to high polymeric material compositions, the photoresistance of which is improved by addition of a copolymer of 2-(2-hydroxy-3-allyl-5-substituted phenyl)benzotriazol compound with maleic acid or fumaric acid compound.

Synthetic polymers such as polyethylene, polypropylene, ABS resin, polyvinyl chloride and polyurethanes are subjected to degradation and discoloration upon exposure to ultraviolet light, with significant deterioration in mechanical strength.

Various kinds of light stabilizers have accordingly been proposed to inhibit such deterioration. Among the conventional stabilizers, 2-hydroxyphenyl-benzotriazols are known to impart a good photostability to the polymer, and therefore are widely used as light stabilizers.

And also, benzotriazols are known to absorb more ultraviolet rays than other absorbers do. Accordingly, benzotriazols are attempted to be used as a component of thermosetting resin, the resin is applied to the surface of the polymer, followed by heat curing, to protect the polymer against photo-oxidation.

However, the benzotriazols available are not entirely satisfactory in stabilizing effect since they are less compatible with the polymer, liable to escape from the polymer during the manufacturing process or heat curing or readily extracted with water or organic solvent, due to their low molecular weight and high crystallinity.

For this reason, Japanese Patent Publication No. 43-18395 provides polymers or copolymers of benzotriazols having acryloyl or methacryloyl group in their structure. These compounds, however, are also unsatisfactory since they are difficult to be manufactured and since they are readily subjected to elimination of benzotriazol molecules by hydrolysis.

SUMMARY OF THE INVENTION

In accordance with the present invention, copolymers of benzotriazol monomers with maleic or fumaric acid derivatives are provided that have a high compatibility with polymeric materials, high heat-stability, high hydrolytic stability and low volatility, with an excellent photo-stabilizing effect, as compared with the benzotriazol monomers which are provided by Japanese Patent Publication No. 41-19179 or the benzotriazol polymers or copolymers which are provided by Japanese Patent Publication No. 43-18395.

The copolymers of average molecular weight within the range from about 1,000 to about 50,000, preferably from about 1,000 to about 10,000, contain the repeating polymeric unit having the formula (I) and the repeating polymeric unit having the formula (II):

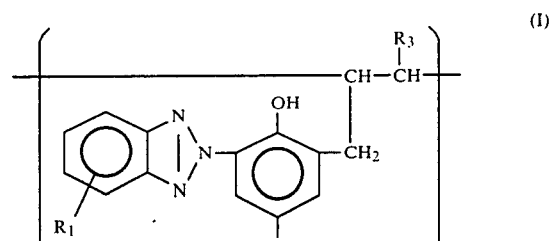

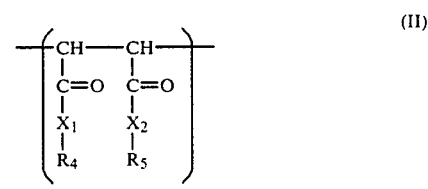

wherein:
$R_1$ is hydrogen, halogen, or alkyl;
$R_2$ is alkyl or aralkyl;
$R_3$ is hydrogen or alkyl;
$R_4$ and $R_5$, which may be the same or different, each are hydrogen, alkyl, cycloalkyl, alkenyl, aralkyl, aryl, glycidyl, tetrahydrofurfuryl, an alkyl group substituted with halogen, cyano or carbonyl radical,
a group having the general formula $-(CH_{2n})-X_3-R_6$,
a group of the formula

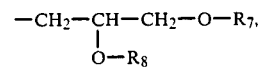

a group of the formula $-(C_2H_4O_m)-R_9$,
a group of the formula $-(C_3H_6O_p)-R_{10}$, a group of the formula 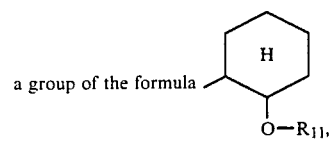

a group of the formula $-CH_2-CH-R_{13}$ or
$\phantom{aaaaaaaaaaaaaaaaaaaa}|$
$\phantom{aaaaaaaaaaaaaaaaaaa}O-R_{12}$ a group of the formula 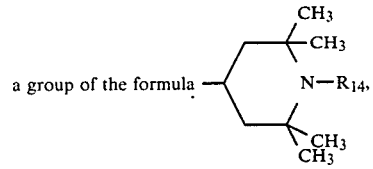

wherein:
each of $R_6$, $R_7$, $R_8$, $R_9$, $R_{10}$, $R_{11}$ and $R_{12}$ are selected from the group consisting of hydrogen, non-substituted or substituted alkyl, cycloalkyl, aryl, aralkyl and acyl, or $R_6$ forms, together with $R_4$ or $R_5$, a heterocyclic ring;
$R_{13}$ is selected from the group consisting of hydrogen and non-substituted or substituted alkyl;
$R_{14}$ is selected from the group consisting of hydrogen, oxyl, non-substituted or substituted alkyl and acyl;

$X_1$ and $X_2$, which may be the same or different, each are —O—,

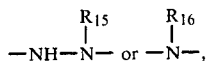

or they form, together with each other, —O— or

$X_3$ is —O—,

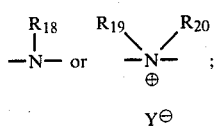

each of $R_{15}$ and $R_{18}$ are selected from the group consisting of hydrogen, non-substituted or substituted alkyl, cycloalkyl, aryl and acyl, or $R_{18}$ forms, together with $R_6$, a heterocyclic ring;

each of $R_{16}$, $R_{17}$, $R_{19}$ and $R_{20}$ are selected from the group consisting of hydrogen, non-substituted or substituted alkyl, cycloalkyl and aryl, or each of $R_{16}$, $R_{19}$ and $R_{20}$ form, together with $R_4$, $R_5$ or $R_6$, a heterocyclic ring;

n is a number from 1 to 20;

m is a number from 1 to 20; and p is a number from 1 to 20.

The repeating unit having the formula (I) in the copolymers of the invention is given by benzotriazol monomers having the formula (Ia):

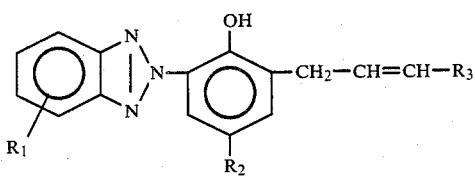

wherein:
$R_1$, $R_2$ and $R_3$ are the same as those shown in the formula (I).

Exemplary benzotriazol monomers include 2-(2-hydroxy-3-allyl-5-methylphenyl)benzotriazol, 2-(2-hydroxy-3-allyl-5-t-butylphenyl)benzotriazol, 2-(2-hydroxy-3-allyl-5-t-octylphenyl)benzotriazol and 2-(2-hydroxy-3-allyl-5-cumylphenyl)benzotriazol. These monomers are known compounds, which are provided by Japanese Patent Publication No. 41-19179 and may be readily manufactured by the reaction of benzotriazol compounds with allyl halide to form phenyl ether, followed by Claisen rearrangement.

The repeating unit having the formula (II) in the copolymers of the invention is given by maleic or fumaric acid, their anhydrides, imides, hydrazides, esters or amides having the formula (IIa):

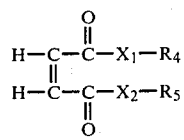

wherein:
$R_4$, $R_5$, $X_1$ and $X_2$ are the same as those shown in the formula (II).

Exemplary esters of maleic or fumaric acid include esters of alkyl such as methyl, ethyl, butyl, octyl, lauryl or stearyl; esters of cycloalkyl such as cyclohexyl, t-butylcyclohexyl, 4-(1',1'-dimethyl-1'-cyclohexylmethyl)cyclohexyl or 1-cyclohexylmethyl; esters of aryl such as phenyl, cresyl or xylenyl; esters of aralkyl such as benzyl, phenethyl or cumyl; esters of alkenyl such as vinyl or allyl; esters of an alkyl group substituted with a substituent having oxygen atoms such as glycidyl, tetrahydrofurfuryl, ethoxyethyl, diethyleneglycol ethoxy, hydroxyethyl, 2-hydroxypropyl, methoxybutyl or 3-methyl-3-methoxybutyl; esters of an alkyl group substituted with amino group such as dimethyl aminoethyl, ethyl aminoethyl, diethyl aminoethyl or 2,2,6,6-tetramethyl-4-piperidyl; esters of an alkyl group substitued with amide group such as stearamide methyl or stearamide ethyl; esters of an alkyl group substituted with ester group such as 2-hydroxy-3-acetyloxy propyl or 2-hydroxy-3-lauryloxypropyl; esters of an alkyl group substituted with carbonyl group such as ketobutyl; esters of an alkyl group substituted with halogen atoms such as 2-(2'-chloroethyloxy)ethyl and 3-chloropropyl; and esters of an alkyl group substituted with quaternary ammonium such as chloride of trimethylammonium ethyl ester. Exemplary amides of maleic or fumaric acid include amides of primary or secondary amines such as diethylamine, butylamine, dicyclohexylamine, allylamine, morpholine, 3-ethoxypropylamine, 3-methoxypropylamine, diethyl aminopropylamine, methyl aminopropylamine, bis(2-cyanoethyl)amine, N-aminopropylmorpholine, piperidine, 1-amino-4-methylpiperadine or 2,2,6,6-tetramethyl-4-piperidylamine.

The copolymers of the invetnion can be readily prepared by copolymerization of benzotriazol monomers having the formula (Ia) with maleic or fumaric acid derivatives having the formula (IIa) in the presence of initiator such as azonitrile compounds or organic peroxides.

In this case, the mole ratio of the monomer having the formula (Ia) to the monomer having the formula (IIa) is within the range between 1:10 and 10:1, preferably between 1:2 and 2:1. Also, the copolymerization may be carried out with small amounts of other copolymerizable monomers such as acrylates, methacrylates, styrene, alkyl vinyl ethers, α-olefins or vinyl acetate.

The following Examples are illustrative.

EXAMPLE 1

Copolymerization of 2-(2-hydroxy-3-allyl-5-methylphenyl)benzotriazol with dibutylmaleate (Copolymer 1)

The mixture of 26.5 g of 2-(2-hydroxy-3-allyl-5-methylphenyl)benzotriazol and 22.4 g of dibutylmaleate and 9.8 g of dicumylperoxide was dissolved in 25 ml of xylene. The mixture was stirred under $N_2$ for 8 hours at a temperature of 122° C. After addition of 2.65 g of dibutylmaleate and 4.9 g of dicumylperoxide and 25 ml of xylene, the mixture was stirred for additional 10 hours at the same temperature and then stirred for 3 hours at a temperature of 160° C. The solvent was stripped under reduced pressured to give a pale yellow viscous product of average molecular weight of about 3,000 (Copolymer 1).

An infrared spectrum of the product indicated major peaks at 1560 cm$^{-1}$ and 750 cm$^{-1}$ due to benzotriazol and at 1720 cm$^{-1}$ due to ester, and also indicated the disappearance of a peak at 1640 cm$^{-1}$ due to double bonds, proving that the product was a desired copolymer.

EXAMPLE 2

Copolymerization of 2-(2-hydroxy-3-allyl-5-methylphenyl)benzotriazol with dicyclohexylmaleate (Copolymer 2)

The mixture of 26.5 g of 2-(2-hydroxy-3-allyl-5-methylphenyl)benzotriazol and 28.0 g of dicyclohexylmaleate and 10.9 g of dibutylperoxide was dissolved in 25 ml of xylene. The mixture was stirred under N$_2$ for 6 hours at a temperature of 130° C. After addition of 5.4 g of dicyclohexylmaleate and 10.9 g of dibutylperoxide and 25 ml of xylene, the mixture was stirred for additional 6 hours at the same temperature and then stirred for 3 hours at a temperature of 160° C. The solvent was stripped under reduced pressure to give a pale yellow glassy product of average molecular weight of about 3500 (Copolymer 2).

An infrared spectrum of the product indicated major peaks at 1560 cm$^{-1}$ and 750 cm$^{-1}$ due to benzotriazol and at 1720 cm$^{-1}$ due to ester, and also indicated the disappearance of a peak at 1640 cm$^{-1}$ due to double bonds, proving that the product was the desired copolymer.

The softening point of the copolymer is 50° to 60° C.

EXAMPLE 3

Copolymerization of 2-(2-hydroxy-3-allyl-5-methylphenyl)benzotriazol with bis(tetrahydrofurfuryl)maleate (Copolymer 3)

The desired copolymer (Copolymer 3) was obtained in the same process as that of EXAMPLE 2 except that bis(tetrahydrofurfuryl)maleate was used in place of dicyclohexylmaleate. The product was liquid and its molecular weight was about 2500.

EXAMPLE 4

Copolymerization of 2-(2-hydroxy-3-allyl-5-methylphenyl)benzotriazol with bis(3-methyl-3-methoxybutyl)maleate (Copolymer 4)

The desired copolymer (Copolymer 4) was obtained in the same process as that of EXAMPLE 2 except that bis(3-methyl-3-methoxybutyl)maleate was used in place of dicyclohexylmaleate. The product was liquid and its molecular weight was about 2000.

EXAMPLE 5

Copolymerization of 2-(2-hydroxy-3-allyl-5-methylphenyl)benzotriazol with bis(2-butoxyethyl)maleate (Copolymer 5)

The desired copolymer (Copolymer 5) was obtained in the same process as that of EXAMPLE 2 except that 1 bis(2-butoxyethyl)maleate was used in place of dicyclohexylmaleate. The product was liquid and its molecular weight was about 3000.

Small amounts of the copolymers of this invention when combined with synthetic resin improve the light stability of the resin. The amount of the copolymer is generally within the range from aout 0.001 to about 10 wt%, preferably form about 0.01 to 5 wt%.

Synthetic resins that can have their resistance to deterioration enhanced with the copolymers according to this invention include α-olefin polymers such as polyethylene, polypropylene, polybutene-1, poly-3-methylbutene-1, and copolymers thereof, such as copolymers of ethylene, propylene and butene-1 with each other and with other copolymerizable mixtures thereof, such as ethylenevinyl acetate copolymer; ethylene-propylene copolymer; polystyrene; polyvinyl acetate; polyacrylic esters; copolymers from styrene and another monomer (for example, maleic anhydride, butadiene, and acrylonitrile); acrylonitrile-butadienestyrene copolymer, acrylic acid ester-butadiene-styrene copolymer, methacrylic acid ester-butadiene-styrene copolymer, polymethacrylate esters such as polymethacrylate; polyvinyl alcohol; polyvinyl formal; polyvinyl butyral; polyphenyleneoxides; linear polyesters such as polyethyleneterephthalate and polybutyleneterephthalate; polyamides such as polycaprolactam and polyhexamethyleneadipamide; polycarbonates; polyacetals; polyurethanes; cellulosic resins; phenol-formaldehyde resins; urea-formaldehyde resins; melamine-formaldehyde resins; epoxy resins; unsaturated polyester resins; silicone resins; halogen-containing resins such as polyvinyl chloride, polyvinyl bromide, polyvinyl fluoride, polyvinylidene chloride, polyvinylidene fluoride, and copolymers thereof, chlorinated polyethylene, chlorinated polypropylene, copolymers of vinylchloride with other copolymerizable monomers such as vinyl acetate, ethylene, propylene, styrene, isobutene, vinylidene chloride, maleic anhydride, acrylonitrile, butadiene, isoprene, acrylic esters and maleic esters; and rubbers such as polyisoprene rubber, polybutadiene rubber, epichlorohydrin rubber, chloroprene rubber, chlorinated rubber and blends of any of the above.

The copolymers of benzotriazols in the invention can be combined with conventional heat stabilizers such as phenolic antioxidants, thioethers, organic phosphites, organic phosphonates and other light stabilizers, thereby constituting light and heat stabilizer compositions of the invention.

In addition, other conventional additives for synthetic polymers, such as metal soaps, organic tin compounds, metal deactivators, epoxy compounds, plasticizers, pigments, fillers, forming agents, lubricants, processing aids, flame-proofing agents and anti-static agent, can be employed.

The stabilized polymer can be worked into the desired shape, such as by milling, calendering, extruding or injection molding or fiber-forming. The copolymers of the invention can also be used as a component of paints, binders for lacquer, adhesives or photo materials.

The following Examples represent preferred embodiments of synthetic resin compositions in accordance with the invention.

EXAMPLE 6

Polypropylene compositions were prepared using stabilizers of the invention and two of the prior art, and having the following formulation:

| Ingredient | Parts by Weight |
|---|---|
| Polypropylene | 100 |
| Calcium stearate | 0.1 |
| Pentaerythritol tetrax (3,5-di-t-butyl-4-hydroxphenyl-propionate) | 0.1 |
| Tris(2,4-di-t-butylphenyl) phosphite | 0.1 |
| Stabilizer as shown in Table I | 0.2 |

The compositions were thoroughly blended in a Brabender Plastgraph, and then compression-molded to form sheets 0.5 mm thick. Pieces 2.5 cm square are cut off from the sheets and exposed to a high voltage mercury lamp. The hours to failure were noted, and are shown in Table I.

TABLE I

| Example No. | Stabilizer | Hours to Failure |
|---|---|---|
| Control 1 | 2-(2-hydroxy-5-methyl-phenyl)benzotriazol | 120 |
| Control 2 | 2-(2-hydroxy-3-allyl-5-methylphenyl)benzotriazol | 150 |
| Example 1 | Copolymer 1 | 380 |
| Example 2 | Copolymer 2 | 450 |
| Example 3 | Copolymer 3 | 300 |
| Example 4 | Copolymer 4 | 280 |
| Example 5 | Copolymer 5 | 360 |

EXAMPLE 7

Polypropylene compositions were prepared using stabilizers of the invention and two of the prior art, and having the following formulation:

| Ingredient | Parts by Weight |
|---|---|
| Polypropylene | 100 |
| Calcium stearate | 0.1 |
| Pentaerythritol tetrax (3,5-di-t-butyl-4-hydroxohenyl-propionate) | 0.1 |
| Bis(2,2,6,6-tetramethyl-4-piperidyl)sebacate | 0.1 |
| Stabilizer as shown in Table II | 0.1 |

The compositions were thoroughly blended in a Brabender Plastgraph, and then compression-molded to form sheets 0.5 mm thick. Pieces 2.5 cm square are cut off from the sheets and exposed to a high voltage mercury lamp. The hours to failure were noted, and are shown in Table II.

TABLE II

| Example No. | Stabilizer | Hours to Failure |
|---|---|---|
| Control 1 | 2-(2-hydroxy-5-methyl-phenyl)benzotriazol | 410 |
| Control 2 | 2-(2-hydroxy-3-allyl-5-methylphenyl)benzotriazol | 450 |
| Example 1 | Copolymer 1 | 720 |
| Example 2 | Copolymer 2 | 850 |
| Example 3 | Copolymer 3 | 680 |
| Example 4 | Copolymer 4 | 650 |
| Example 5 | Copolymer 5 | 700 |

The improvement when using the light stabilizers of the invention as compared with the Controls is evident from the above data.

Since many embodiments of the invention may be made without departing from the spirit and scope thereof, it is to be understood that the invention is not limited by the specific examples except to the extent defined in the following claims.

What is claimed is:

1. Copolymers of average molecular weight within the range from about 1,000 to about 50,000, preferably from about 1,000 to about 10,000, are provided containing the repeating polymeric unit having the formula (I) and the repeating polymeric unit having the formula (II):

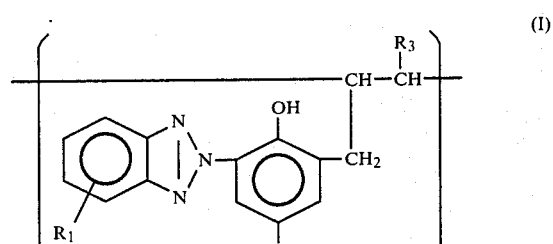

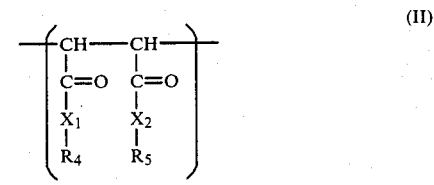

wherein:

$R_1$ is hydrogen, halogen, or alkyl;

$R_2$ is alkyl or aralkyl;

$R_3$ is hydrogen or alkyl;

$R_4$ and $R_5$, which may be the same or different, each are hydrogen, alkyl, cycloalkyl, alkenyl, aralkyl, aryl, glycidyl, tetrahydrofurfuryl, an alkyl group substituted with halogen, cyano or carbonyl radical, a group having the general formual $-(CH_2)_n-X_3-R_6$, a group of the formula $$-CH_2-CH-CH_2-O-R_7,$$
$$\phantom{-CH_2-CH}|$$
$$\phantom{-CH_2-CH-CH_2}O-R_8$$

a group of the formula $-(C_2H_4O_m)-R_9$, a group of the formula $-(C_3H_6O_p)-R_{10}$, a group of the formula 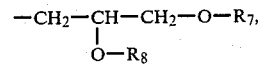

a group of the formula $-CH_2-CH-R_{13}$ or
$\phantom{a group of the formula -CH_2-CH}|$
$\phantom{a group of the formula -CH_2-CH-R}O-R_{12}$ a group of the formula 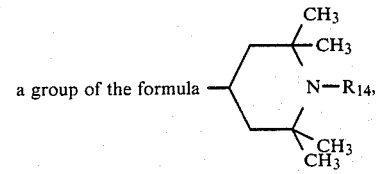

wherein:

each of $R_6$, $R_7$, $R_8$, $R_9$, $R_{10}$, $R_{11}$ and $R_{12}$ are selected from the group consisting of hydrogen, non-substituted or substituted alkyl, cycloalkyl, aryl, aralkyl and acyl, or $R_6$ forms, together with $R_4$ or $R_5$, a heterocyclic ring;

$R_{13}$ is selected from the group consisting of hydrogen and non-substituted or substituted alkyl;

$R_{14}$ is selected from the group consisting of hydrogen, oxyl, non-substituted or substituted alkyl and acyl;

$X_1$ and $X_2$, which may be the same or different, each are —O—,

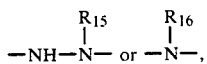

or they form, together with each other, —O— or

$X_3$ is —O—,

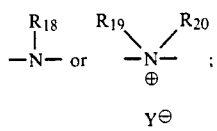

each of $R_{15}$ and $R_{18}$ are selected from the group consisting of hydrogen, non-substituted or substituted alkyl, cycloalkyl, aryl and acyl, or $R_{18}$ forms, together with $R_6$, a heterocyclic ring;

each of $R_{16}$, $R_{17}$, $R_{19}$ and $R_{20}$ are selected from the group consisting of hydrogen, non-substituted or substituted alkyl, cycloalkyl and aryl, or each of $R_{16}$, $R_{19}$ and $R_{20}$ form, together with $R_4$, $R_5$ or $R_6$, a heterocyclic ring;

n is a number from 1 to 20;
m is a number from 1 to 20; and
p is a number from 1 to 20.

2. Copolymers according to claim 1 in which $R_1$ is hydrogen.

3. Copolymers according to claim 1 in which $R_2$ is alkyl.

4. Copolymers according to claim 1 in which $R_3$ is hydrogen.

5. Copolymers according to claim 1 in which each of $R_4$ and $R_5$ are alkyl.

6. Copolymers according to claim 1 in which each of $R_4$ and $R_5$ are cycloalkyl.

7. Copolymers according to claim 1 in which each of $R_4$ and $R_5$ are tetrahydrofurfuryl.

8. Copolymers according to claim 1 in which each of $R_4$ and $R_5$ are —(CH$_{2n}$)—X$_3$—R$_6$ wherein
$R_6$ is alkyl;
$X_3$ is —O—; and
n is 5.

9. Copolymers according to claim 1 in which each of $R_4$ and $R_5$ are —(C$_2$H$_4$O$_m$)—R$_9$ wherein
$R_9$ is alkyl and m is 1.

10. Copolymers according to claim 1 in which each of $X_1$ and $X_2$ are —O—.

11. Copolymers according to claim 1 in which $R_4$ and $R_5$ are the same and $X_1$ and $X_2$ are the same.

12. A polymeric material composition having improved resistance to deterioration comprising a polymeric material and a copolymer in accordance with claim 1 and the amount of the copolymer is within the range from about 0.001 to about 10 wt%, preferably from about 0.01 to about 5 wt%.

13. A stabilized material composition according to claim 12 in which the polymeric material is synthetic polymer.

14. A stabilized polymer composition according to claim 13 in which the synthetic polymer is alpha-olefin polymer.

15. A stabilized polymer composition according to claim 14 in which the polyolefin is polypropylene.

16. A stabilized polymer composition according to claim 13 in which the polymer contains other additives.

17. A stabilized polymer composition according to claim 16 in which the additive is another light stabilizer.

* * * * *